Figure 1:
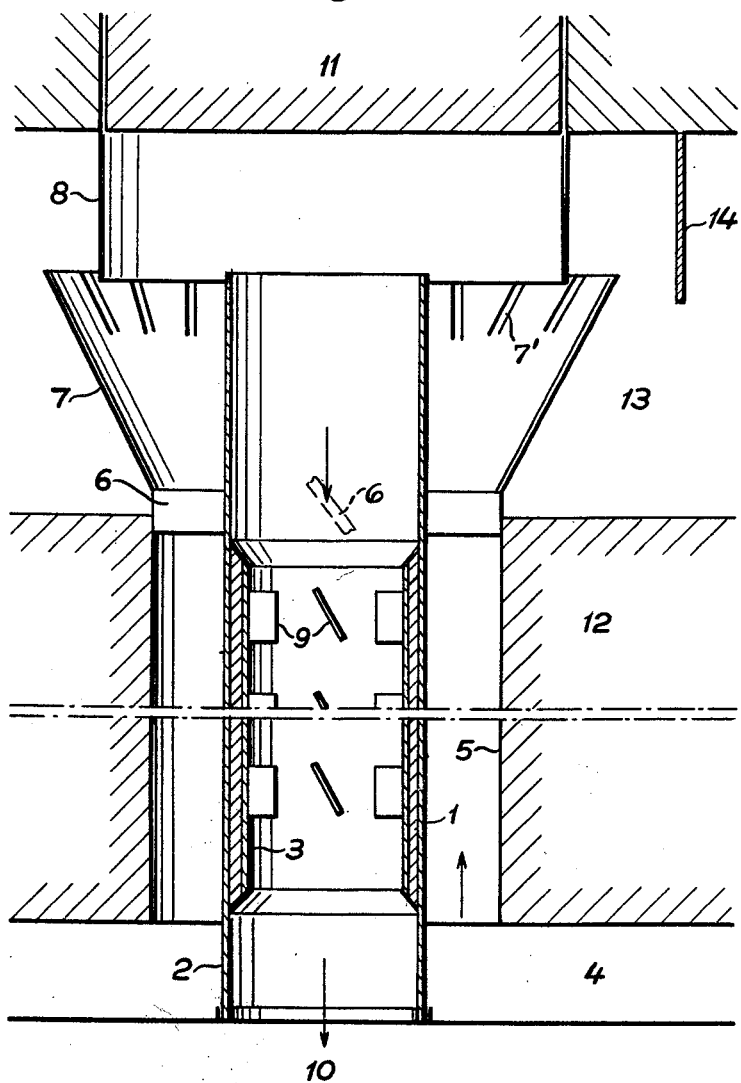

April 13, 1965    L. E. SÖDERHOLM    3,178,358
BOILING WATER NUCLEAR REACTOR WITH DRYING
AND SUPERHEAT ARRANGEMENT
Filed Dec. 27, 1962                         2 Sheets-Sheet 2
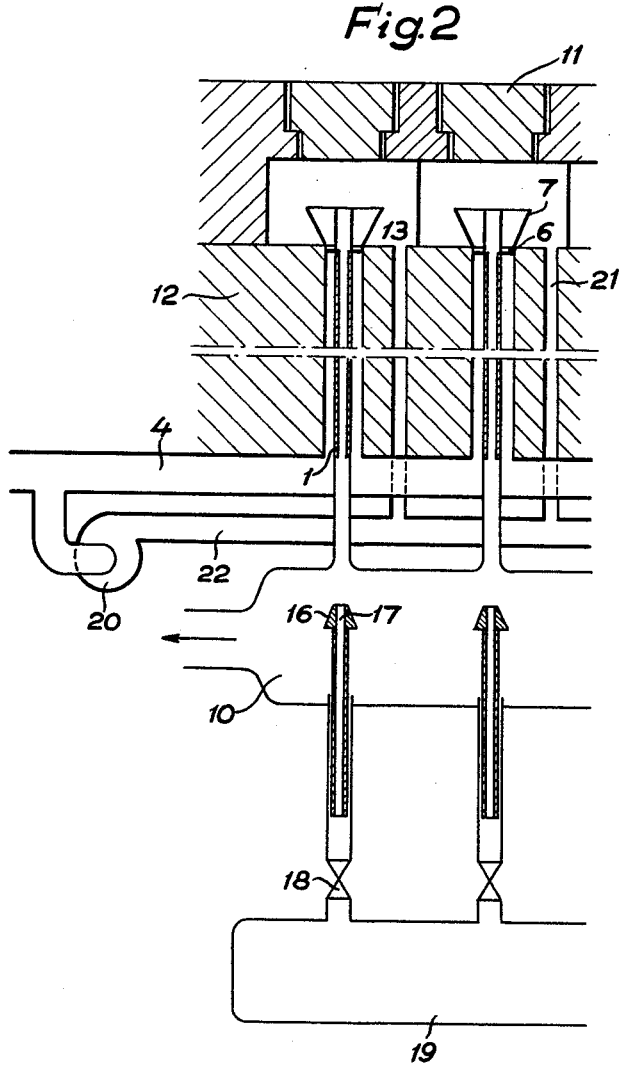
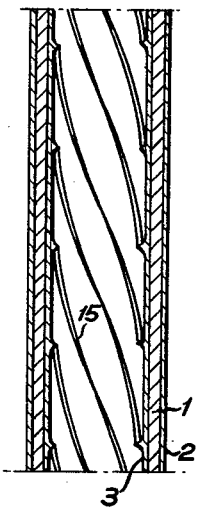
INVENTOR.
Lars Erik Söderholm
BY
Bailey, Stephens & Huettig
Attorneys

United States Patent Office 3,178,358
Patented Apr. 13, 1965

3,178,358
BOILING WATER NUCLEAR REACTOR WITH DRYING AND SUPERHEAT ARRANGEMENT
Lars Erik Söderholm, Vasteras, Sweden, assignor to Allmanna Svenska Elektriska Aktiebolaget, Vasteras, Sweden, a Swedish corporation
Filed Dec. 27, 1962, Ser. No. 247,666
Claims priority, application Sweden, Dec. 28, 1961, 13,017/61
6 Claims. (Cl. 176—54)

The present invention concerns improvements in nuclear reactors of the type where a liquid coolant is passed during boiling along the outside of tubular fuel assemblies, whereafter the steam generated during the boiling is led through the inner space of said tubular fuel assemblies.

One object of the invention is to provide means for obtaining increased boiling and hence increased steam generation within a limited space.

Another object of the invention is to provide improved means for drying and superheating the steam generated.

Still another object of the invention is to provide an improved and simplified reactor construction.

Other objects and advantages of the invention will be apparent from the following detailed description referring to the accompanying drawings which schematically show parts of a nuclear reactor according to the invention.

FIGURE 1 shows the coolant circulation system at one fuel assembly. FIGURE 2 shows the general construction of a nuclear reactor according to the invention. FIGURE 3 shows details of a fuel assembly according to the invention.

In the figures, 1 indicates a fuel assembly being surrounded by an outer coating or cladding tube 2 and an inner coating or cladding tube 3. The coolant is supplied through a duct 4 and is thereafter led by a tubular member 5 upwards in the direction of the fuel assembly on its outer side. The tubular member 5 is surrounded by the moderator 12 of the reactor. During the passage around the outside of the fuel assembly, the coolant is warmed up at least substantially to the boiling point and at the end of the fuel element it is led between inclined guiding surfaces 6 which may be formed as guiding blades or the like and is thereby brought into fast rotation. The flow resistance at the guiding blades 6 causes a certain pressure drop and hence the pressure of the coolant is somewhat lower after the guiding blades than before. The lower pressure causes increased boiling and the coolant being in fast rotation is, by the centrifugal force, pressed upwards along the funnel-shaped surface 7. The centrifugal force also causes a separation of the coolant so that the liquid part is pressed outwards while the vapourised part is kept nearer the centre of rotation. The liquid part of the coolant thus forms a layer on the tapered surface 7 and thereby an inclined funnel-shaped boiling surface is obtained of relatively great extension which causes a faster steam generation. In order to make use as far as possible of the kinetic energy of the liquid at the outer edge of the cone 7, it may be provided at this part with longitudinal grooves 7' or the like. The tangential component of velocity of the liquid is then due to friction transformed into heat while its axial component of velocity forces the remaining part of the liquid outwards over the edge of the cone. The steam is collected in a steam collector which may be formed as a tubular member 8, the object of which is chiefly to prevent liquid drops from splashing into the steam and being mixed with it. The liquid having passed the edge of the funnel 7, it is led to a collecting space 13 or the like, possibly guided by a partition wall 14. From the collecting space 13 the coolant is repumped to the duct 4. As shown in FIGURE 2, the collecting space 13 is in connection with a pump 20 through ducts 21 and 22, which pump pumps the coolant to the duct 4.

From the steam collector the steam is led downwards through the inner space of the fuel assembly. At the inner coating tube 3 of the fuel assembly a plurality of inclined guiding flanges 9 are attached, which bring the flowing steam into rotation. Thereby, the advantage is obtained that the density of the steam due to the centrifugal force is greater close to the fuel assembly, which causes a more effective heat transmission. Possibly remaining liquid drops are pressed by the centrifugal force against the fuel assembly and are vapourised and, moreover, the guiding flanges if they are attached to the inner coating tube of the fuel assembly, act as cooling flanges causing thereby an increase of the heat transmitting surface. The steam is superheated in the passage through the interior of the fuel element and is thereafter led to a collecting space 10 for superheated steam.

The guiding flanges 9 at the inner side of the fuel assembly may be formed in several different ways. In the figure separate short guiding blades are shown equally spread around the circumference and placed in a plurality of layers under each other. The guiding flanges may also be formed as continuous helical surfaces fitted inside the fuel assembly, for instance by attachment to the inner cladding tube of the fuel assembly, or otherwise the inner tube may be provided by means of rolling with a great number of long helical ribs running close together. FIGURE 3 shows in section part of a tubular fuel assembly 1 with helical guiding flanges 15 on the inner cladding tube 3. These flanges are formed as ribs rolled in the cladding tube 3.

When a fuel element has to be changed in the reactor the cover 11 is removed and a sealing plug 16 (FIGURE 2) should be applied suitably from below at the opening to the steam space 10 and pressed against this opening so that coolant from the duct 4 cannot flow down in the steam space when the fuel assembly and its coating tube 2 is hoisted up by the fuel exchange machine of the reactor. The sealing plug should suitably be provided with an axial duct 17 closable by a valve 18. Through this duct the liquid coolant which is situated inside a recently inserted fuel assembly may be easily led to a suitable container 19 before the sealing plug is removed from its opening.

In order to obtain within a limited space a great boiling surface for the boiling coolant, it is suitable to make the inclined guiding surfaces 6 which bring the coolant in rotation immediately after the passage along the outside of the fuel assemblies 1 curved or arrange them in such a great angle against the flow direction that the rotation movement gained has a relatively high speed. The flow resistance at the guiding surfaces 6 will then be relatively great and a certain pressure drop in the coolant is caused at the passage between the guiding surfaces. The fast rotation of the coolant is used in an advantageous way by arranging after the guiding surfaces the funnel-shaped collecting surface 7, along which the coolant flows due to the centrifugal force. Due to the pressure drop at the passage between the guiding surfaces, the coolant will at the present somewhat lower pressure boil intensely and a large and effective boiling surface is obtained in the funnel 7. However, this construction requires a relatively high pressure in the coolant so that the pressure drop can be allowed which is necessary in order to obtain sufficiently fast rotation of the coolant. For the purpose of avoiding a more expensive construction of the reactor in general due to the higher pressure, it is suitable to let the coolant circulate in a manner known per se in a closed pipe system, so-called pressure pipe system. The high pressure results in that the coolant at the outside of the fuel assembly may obtain a somewhat higher temperature before the boiling starts. The amount of steam bubbles in the liquid will therefore be considerably smaller which considerably improves the heat transmission to the coolant. As the pressure at the funnel-shaped surface 7 is somewhat lower, the boiling point of the coolant falls and a violent and fast boiling takes place without any unfavourable influence on the heat transmission by the steam generated.

According to the invention it is especially suitable to arrange the collecting room 10 for the superheated steam beneath the fuel assemblies 1 which results in that the total height of the reactor is decreased. In order to avoid too many openings in the pressure vessel forming the reactor tank, nuclear reactors are usually provided with one outer and one inner fuel exchange machine, whereby only one fuel exchange opening has to be arranged at the top of the reactor. However, the invention makes it possible to arrange every fuel assembly and its coolant system as a substantially closed unity so that every opening in the cover only communicates with a limited space, as shown in FIGURE 2. Thereby, the drawbacks concerning the structural strength of a common cover with several openings are avoided and it is not necessary to provide the reactor with a pressure-proof shell about the cover. In this case it is naturally sufficient to arrange only one fuel exchange machine which still decreases the costs considerably.

The invention is not limited to the shown embodiment but a plurality of different embodiments may be performed within the scope of the following claims.

I claim:

1. In a nuclear reactor comprising tubular fuel assemblies having inner spaces therethrough and tubular means for passing a liquid coolant along the outer side of each of said tubular fuel assemblies, said coolant being warmed up at least substantially to the boiling point during said passage, guiding blades arranged in inclined position in said tubular means at the end of said fuel assemblies, a funnel-shaped surface arranged adjacent to said guiding blades in the direction of the flow of said coolant in said tubular means and increasing in cross-section in the direction of such flow, and means within the confines of said funnel-shaped surface for collecting the steam generated at said funnel-shaped surface and for leading it through the inner spaces, of said tubular fuel assemblies while permitting the escape of liquid.

2. A nuclear reactor as claimed in claim 1, in which the outer edge of said funnel-shaped surface is provided with longitudinal grooves.

3. A nuclear reactor as claimed in claim 1, in which the inner surfaces of the inner spaces in said tubular fuel assemblies are provided with inclined guiding flanges, having the shape of separate short guiding blades.

4. A nuclear reactor as claimed in claim 1 in which said inner spaces in said tubular fuel assemblies constitute the interiors of inner cladding tubes having helical guiding flanges on their inner walls.

5. A nuclear reactor as claimed in claim 1, in which the fuel assemblies are vertical, having at least one collecting space for superheated steam arranged beneath the fuel assemblies, a container for coolant, a sealing plug provided with a closable axial duct leading to said container for coolant, and means for inserting said sealing plug into an opening between said steam collecting space and said fuel element.

6. A nuclear reactor as claimed in claim 1, comprising a high pressure pipe system for circulation of the liquid coolant.

References Cited by the Examiner

UNITED STATES PATENTS

| 2,938,845 | 5/60 | Threshow | 176—54 |
| 2,949,416 | 8/60 | Wheelock | 176—76 |
| 2,987,458 | 6/61 | Breden et al. | 176—73 |
| 3,063,925 | 11/62 | Huet | 176—54 |
| 3,072,555 | 1/63 | Barth et al. | 176—54 |

FOREIGN PATENTS

| 844,764 | 8/60 | Great Britain. |

CARL D. QUARFORTH, *Primary Examiner.*